United States Patent [19]

Lim

[11] Patent Number: 5,690,984
[45] Date of Patent: Nov. 25, 1997

[54] PROCESS FOR MAKING A BEVERAGE FROM PINE NEEDLES

[76] Inventor: Jung Geun Lim, 736, Hoengchon-Ri, Hoengchon-Myon, Hadong-Gun Kyungsangnamdo, Rep. of Korea

[21] Appl. No.: 522,569

[22] Filed: Sep. 1, 1995

[51] Int. Cl.$^6$ .................................................. A23L 2/385
[52] U.S. Cl. ..................... 426/590; 426/330.5; 426/425; 426/435; 426/506; 426/638; 426/650
[58] Field of Search .............................. 426/590, 330.5, 426/425, 435, 506, 638, 650

[56] References Cited

FOREIGN PATENT DOCUMENTS

| | | | |
|---|---|---|---|
| 55-79621 | 4/1982 | Japan . | |
| 1063339 | 3/1989 | Japan | 426/432 |
| 10-063085 | 7/1993 | Rep. of Korea . | |
| 10-064782 | 8/1993 | Rep. of Korea . | |

OTHER PUBLICATIONS

Kiba, Y. "Birch flavored with medicinal herbs" Kharchova–Promislovist, 1976, No. 2 pp. 52,53.

*Primary Examiner*—Helen Pratt
*Attorney, Agent, or Firm*—Rabin, Champagne & Lynt, P.C.

[57] ABSTRACT

A process for making a good-tasting alcoholic or nonalcoholic beverage from pine needles. Pine needles are boiled in water with licorice root, cinnamon powder, black beans, and *Ganoderma Lucidum*. The mixture/solution is cooled in the ambient environment, reheated, and then filtered. The resulting beverage retains the beneficial qualities of a pine needle beverage, while the bitter taste and odor of terpenes are substantially eliminated.

20 Claims, No Drawings

PROCESS FOR MAKING A BEVERAGE FROM PINE NEEDLES

FIELD OF THE INVENTION

The present invention relates to an alcoholic or nonalcoholic beverage making technique, and more particularly, to a method for making health beverages from pine needles. The present invention provides a simple and economic process for making a beverage containing bioactive materials from pine needles without the essence extraction steps carried out in the conventional beverage production process.

BACKGROUND OF THE INVENTION

In countries such as China, Korea, and Japan, various kinds of plants or animals are used in alcoholic or nonalcoholic beverage production for the purpose of adding a delicate sense of taste and improving the nutrient conditions of the beverage.

Pine needles are one of the herbs used in oriental medicine. Pine needles contain many nutrients and bioactive materials, such as proteins, carbohydrates, lipids, minerals, fat-soluble vitamins, water-soluble vitamins, wax, tanin, and chlorophylls.

However, pine needles also contains some components unfavorable to eat. One of such components is known as terpene. Terpenes taste bitter and have a pungent, unpleasant odor. Therefore, beverages containing pine needle components have not been very popular.

Recently, some researchers have developed ways to remove terpenes from pine needles and/or its extracted essence to improve the taste of beverages containing pine needle components.

For example, the process for making a pine needle beverage comprising the steps of extracting essences from pine needles; refining the extracted essences by heating to remove terpene; concentrating the refined essences to simplify storage, carriage, and/or usage; mixing the concentrated essences with other food ingredients; diluting the mixture to produce end products; and sterilizing and packing the end products was disclosed in Korean Patents 93-3880 and 93-1275.

The above method has some problems on the economic and is too expensive and complex to be practical for production on a large scale. A more simple, inexpensive process is needed in order to efficiently provide an economical, good-tasting pine needle beverage.

SUMMARY OF INVENTION

It is therefore an object of the present invention to provide a simple, economical process for making a good-tasting pine needle beverage.

This and other objects and advantages of the present invention will be apparent to those of ordinary skill in the art after inspection of the detailed description and appended claims.

One embodiment of this invention provides a process for manufacturing a good tasting pine needle beverage containing alcoholic and/or nonalcoholic components. In this process, pine needles are boiled in water with licorice root, cinnamon powder, black bean, and *Ganoderma Lucidum*, for about 3 hours at about 100°–120° C. The above mixture/solution is cooled to 80°–90° C. in the ambient environment for about 2 hours is reheated to 100°–120° C. for about 5 hours, and is then filtered.

This process is simpler, quicker, and more economical than conventional processes for providing pine needle beverages. The present method is also flexible in that the basic pine needle beverage may be modified to suit a particular need. For example, in an alternative embodiment a, sweetener such as suger, honey, or corn syrup and/or an, acidifying agent such as citric acid, lactic acid, or acetic acid, and/or refined alcohol, or other ingredients, can be added to the mixture at any point in the above process as desired to sweeten the resulting beverage, to make the beverage an alcoholic drink, or to produce any other variant of the pine needle beverage.

When producing the basic sweetened pine needle beverage, the preferred composition of each component is as follows:

pine needles 5–7 weight percent,
dried licorice root 0.5–0.6 weight percent,
dried cinnamon 0.1–0.2 weight percent,
dried black bean 0.5–0.6 weight percent,
sweetener, such as honey or suger 4.4–6 weight percent,
*Ganoderna Lucidum* 0.2–0.3 weight percent, and
water 85–90 weight percent.

DETAILED DESCRIPTION OF THE PRESENT INVENTION

Thus, the present invention is preferably carried out by the process comprising the steps of:

a) boiling pine needles in water based mixture including licorice root, cinnamon powder, black bean, and *Ganoderma Lucidum*, for about 3 hours at about 100°–120° C. in a pressure vessel, b) cooling the above mixture/solution in the ambient environment until its temperature comes down to about 80°–90° C. (for about 2 hours), c) reheating said mixture/solution to about 100°–120° C. for about 5 hours, and, d) filtering and resulting liquid, such as by passing said mixture/solution through a filter.

According to the process of the present invention, the operation of boiling followed by cooling followed by reheating acts to remove terpenes from the pine needles. In addition, black bean, licorice root, and cinnamon powder can dilute or titrate the bitter taste of any residuary terpene. Also, licorice root and cinnamon powder provide a bioactive material and fragrance of their own to the end product. Black bean, licorice root, cinnamon powder, and *Ganoderma Lucidum* need not all be present in the mixture in order to dilute the residuary terpene taste. Any proportion of any of these ingredients may be added to suit particular tastes.

After the terpene taste and odor is substantial removed from the mixture/solution, the flavor may be modified or enhanced as desired. A sweetener such as suger, honey, or corn syrup, an acidifying agent such as citric acid, lactic acid, or acetic acid, and/or refined alcohol, or other ingredients, can be added to the mixture/solution at any point in the above process as desired.

The preferred compositions of each component in a basic sweetened pine needle drink produced by the method of the present invention are as follows;

pine needles 5–7 weight percent,
dried licorice root 0.5–0.6 weight percent,
dried cinnamon 0.1–0.2 weight percent,
dried black bean 0.5–0.6 weight percent, honey or suger 4.4–6 weight percent,

*Ganoderma Lucidum* 0.2–0.3 weight percent, and water 85–90 weight percent.

Other proportions of these ingredients, as well as other ingredients, may be used to produce the particular desired pine needle beverage. The present invention is hereunder described with reference to the following examples which are not exhaustive and do not limit the scope of the present invention.

EXAMPLE 1

5 weight percent of pine needles, 0.5 weight percent of dried licorice root, 0.1 weight percent of dried cinnamon, 0.5 weight percent of dried black bean, 4.4 weight percent of honey, and 0.2 weight percent of dried *Ganoderma Lucidum* are boiled in 89.3 weight percent of water for 3 hours at 100°–120° C. in a pressure vessel. The solution is then cooled to 80°–90° C. in the ambient environment over a time period of 2 hours is reheated to 100°–120° C. for 5 hours is then passed through a filter. The filter is packed into a PET bottle and sterilized by U.V light.

EXAMPLE 2

7 weight percent of pine needles, 0.6 weight percent of dried licorice root, 0.2 weight percent of dried cinnamon, 0.6 weight percent of dried black bean, 5 weight percent of honey, and 0.3 weight percent of dried *Ganoderma Lucidum* were boiled in 86.3 weight percent of water for 3 hours at 100°–120° C. in a pressure vessel. The solution is then cooled to 80°–90° C. in the ambient environment during 2 hours, reheated to 100°–120° C. for 5 hours, and is then passed through a filter. The filtrate is packed into a PET bottle and sterilized by U.V light.

EXAMPLE 3

5 weight percent of pine needles, 0.5 weight percent of dried licorice root, and 5 weight percent of honey are boiled in 89.5 weight percent of water for 3 hours at 100°–120° C. in a pressure vessel. The solution is then cooled to 80°–90° C. in the ambient environment over the time period of 2 hours is, reheated to 100°–120° C. for 5 hours, and is then passed through a filter. The filtrate is packed into a PET bottle and sterilized by U.V light.

EXAMPLE 4

6.5 weight percent of pine needles, 0.6 weight percent of dried licorice root, 0.2 weight percent of dried cinnamon, 0.5 weight percent of dried black bean, 6 weight percent of honey, and 0.2 weight percent of dried *Ganoderma Lucidum* are boiled in 86 weight percent of water for 3 hours at 100°–120° C. in the pressure vessel. The solution is then cooled to 80°–90° C. in the ambient environment over a period of 2 hours is reheated to 100°–120° C. for 5 hours, and is then passed through a filter. The filtrate is packed into a PET bottle and sterilized by U.V light.

The obtained beverages obtained using the methods disclosed in examples 1–4 were tested by ten panelists. Among the ten panelists, only one person reported that he could discern the slight bitter taste caused by residual terpene remaining in the beverage produced according to example 4.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A method for making a pine needle beverage, consisting essentially of:

a) boiling a mixture of water, pine needles, licorice root, cinnamon powder, black bean, and *Ganoderma Lucidum*;

b) cooling the mixture;

c) reheating the mixture; and d) filtering the mixture.

2. The method of claim 1, wherein the mixture is boiled at a temperature of between about 100° C. and about 120° C. for about three hours.

3. The method of claim 1, wherein the mixture is cooled ambiently to a temperature of between about 80° C. to about 90° C.

4. The method of claim 3, wherein the mixture is cooled for a period of about two hours.

5. The method of claim 1, wherein the mixture is reheated to a temperature of about 100° C. to about 120° C. for a period of about five hours.

6. The method of claim 1, further comprising adding a sweetener to the mixture.

7. The method of claim 6, wherein the mixture comprises:

a) about 5 weight percent to about 7 weight percent pine needles;

b) about 0.5 weight percent to about 0.6 weight percent licorice root;

c) about 0.1 weight percent to about 0.2 weight percent cinnamon powder;

d) about 0.5 weight percent to about 0.6 weight percent black bean;

e) about 4.4 weight percent to about 6 weight percent sweetener;

f) about 0.2 weight percent to about 0.3 weight percent *Ganoderma Lucidum*; and g) about 85 weight percent to about 90 weight percent water.

8. The method of claim 6, wherein the sweetener is selected from the group consisting of sugar, honey, and corn syrup.

9. The method of claim 8, wherein the mixture comprises:

a) about 5 weight percent pine needles;

b) about 0.5 weight percent licorice root;

c) about 0.1 weight percent cinnamon powder;

d) about 0.5 weight percent black bean;

e) about 4.4 weight percent honey;

f) about 0.2 weight percent *Ganoderma Lucidum*; and g) about 89.3 weight percent water.

10. The method of claim 8, wherein the mixture comprises:

a) about 7 weight percent pine needles;

b) about 0.6 weight percent licorice root;

c) about 0.2 weight percent cinnamon powder;

d) about 0.6 weight percent black bean;

e) about 5 weight percent honey;

f) about 0.3 weight percent *Ganoderma Lucidum*; and g) about 86.3 weight percent water.

11. The method of claim 8, wherein the mixture comprises:
   a) about 6.5 weight percent pine needles;
   b) about 0.6 weight percent licorice root;
   c) about 0.2 weight percent cinnamon powder;
   d) about 0.5 weight percent black bean;
   e) about 6 weight percent honey;
   f) about 0.2 weight percent *Ganoderma Lucidum*; and
   g) about 86 weight percent water.

12. The method of claim 1, further comprising adding an acidifying agent to the mixture.

13. The method of claim 12, wherein the acidifying agent is selected from the group consisting of citric acid, lactic acid, and acetic acid.

14. The method of claim 1, further comprising adding refined alcohol to the mixture.

15. The method of claim 1, wherein the mixture is boiled in a pressure vessel.

16. The method of claim 1, further comprising:
   a) dispensing the filtered mixture into a bottle; and
   b) sterilizing the mixture.

17. A method for making a pine needle beverage, consisting essentially of:
   a) boiling a mixture of water, pine needles, licorice root, and honey;
   b) cooling the mixture;
   c) reheating the mixture; and
   d) filtering the mixture.

18. The method of claim 17, wherein the mixture comprises:
   a) about 5 weight percent pine needles;
   b) about 0.5 weight percent licorice root;
   c) about 5 weight percent honey; and
   d) about 89.5 weight percent water.

19. A method for making a pine needle beverage, consisting essentially of:
   a) boiling a mixture of water, pine needles, licorice root, cinnamon powder, black bean, and *Ganoderma Lucidum* at a temperature of between about 100° C. and about 120° C. for about three hours;
   b) cooling the mixture ambiently to a temperature of between about 80° C. to about 90° C. for a period of about two hours;
   c) reheating the mixture to a temperature of about 100° C. to about 120° C. for a period of about five hours; and
   d) filtering the mixture.

20. The method of claim 19, further comprising adding a sweetener to the mixture, the sweetener being selected from the group of sweeteners consisting of sugar, honey, and corn syrup.

* * * * *